UNITED STATES PATENT OFFICE 2,618,634

PREPARATION OF CELLULOSE DERIVATIVE

Charles L. P. Vaughan, Wilmington, Del., assignor to Hercules Powder Company, Wilmington, Del., a corporation of Delaware No Drawing. Application December 23, 1949, Serial No. 134,852

3 Claims. (Cl. 260—231)

This invention relates to the preparation of carboxyethyl ethers of polysaccharides and, more particularly, to the process of preparing water- and alkali-soluble carboxyethyl ethers of cellulose by the reaction of acrylonitrile with cellulose.

It is well known that the introduction of a carboxyalkyl group into cellulose results in the production of a cellulose derivative having many advantageous properties. Such derivatives which are water and alkali soluble have many commercial applications. Various attempts have been made to prepare carboxyethyl cellulose, one of the most successful methods being the reaction of an alkali cellulose with β-chloro- or β-bromo-propionic acid. However, this process is not economically feasible on a commercial scale. In the first place, hydrogen halide is formed as a by-product, and this represents a considerable mass loss in the overall process. Furthermore, the halo-propionic acids used as starting materials are not only expensive, but they are not readily available for commercial operations. In addition, in all of the prior art processes, the carboxyethyl cellulose has been produced in a "dough" or solution process which makes the isolation of the product difficult.

Now in accordance with this invention, it has been found that carboxyethyl ethers of polysaccharides, as, for example, carboxyethyl cellulose, may be prepared by reacting a suspension of an alkali polysaccharide in an inert solvent with acrylonitrile. The reaction to produce the carboxyethyl derivative takes place in one step, the nitrile group hydrolyzing to the carboxylic group under the conditions used in carrying out the reaction. Thus this new method has the advantages of utilizing readily available raw materials, the process is carried out in one step, and being a fibrous process, the product is readily isolated.

The following examples will illustrate the preparation of carboxyethyl polysaccharides in accordance with this invention. All parts and percentages are by weight unless otherwise indicated.

Example 1

Four parts of chemical cotton ground to over 40 mesh were suspended in 100 parts of dioxane and 10 parts of a 40% aqueous sodium hydroxide solution (4 moles per anhydroglucose unit) were added and the mixture was heated at reflux temperature (about 90° C.) for ½ hour. Acrylonitrile (5.2 parts which was equal to 4 moles per anhydroglucose unit) was then added and the reaction continued at reflux temperature with agitation for 3 hours. The white fibrous product was washed repeatedly with 70% methanol, then with anhydrous methanol and finally was dried in vacuo at 60° C. On analysis the product was found to have a degree of substitution of 0.16 carboxyethyl group per anhydroglucose unit and 0.02 cyanoethyl group per anhydroglucose unit. This carboxyethyl cellulose was soluble in water and completely soluble in dilute alkali to give viscous solutions.

Example 2

Example 1 was repeated except that 10.5 parts of acrylonitrile were added to the alkali cellulose. This was equivalent to 8 moles of acrylonitrile per anhydroglucose unit. The white fibrous product so obtained had a degree of substitution of 0.21 carboxyethyl group and 0.08 cyanoethyl group per anhydroglucose unit. The product was completely soluble in water and dilute alkali to give clear, viscous solutions in each case.

Example 3

Seven parts of 40-mesh chemical cotton were suspended in 100 parts of dioxane and 13 parts of a 40% aqueous sodium hydroxide solution (3 moles per anhydroglucose unit) were added. After agitating for ½ hour at 70° C., 2.30 parts of acrylonitrile (one mole per anhydroglucose unit) were added and the reaction was continued at 70° C. for 3 hours with constant agitation. The carboxyethyl cellulose so obtained was purified as described in Example 1 to give a white fibrous product which was soluble in dilute alkali to give viscous solutions. On analysis it was found to have a degree of substitution of 0.12 carboxyethyl group per anhydroglucose unit.

Example 4

Seven parts of purified cotton linters ground to over 40 mesh were suspended in 100 parts of tert.-butyl alcohol and 13 parts of an aqueous 40% sodium hydroxide solution (3 moles per anhydroglucose unit) were added. The reaction mixture was heated to 70° C. for ½ hour and then 6.9 parts of acrylonitrile (3 moles per anhydroglucose unit) were added and the reaction allowed to continue for 2 hours at 70° C. The product was isolated as described in Example 1 to give a white fibrous product highly swollen in water and soluble in dilute alkali and having a degree of substitution of 0.18.

Example 5

Seven parts of a purified wood pulp ground to over 20 mesh size were suspended in 100 parts of tert.-butyl alcohol. To this suspension was added 14 parts of an aqueous 50% sodium hydroxide solution (4 moles per anhydroglucose unit). The reaction mixture was stirred at 70° C. for ½ hour and then 13.7 parts of acrylonitrile (6 moles per anhydroglucose unit) were added and the reaction continued at 70° C. for an additional 4 hours. The fibrous product was isolated as described in Example 1 to give a product which had a degree of substitution of 0.16 carboxyethyl groups and 0.05 cyanoethyl groups per anhydroglucose unit. The product was soluble in water and dilute alkali.

In accordance with this invention carboxyethyl ethers of polysaccharides may be prepared by the addition of acrylonitrile to the polysaccharide in an organic solvent medium in the presence of an alkaline reagent. This carboxyethylation reaction will proceed readily with any polysaccharide such as cellulose, or partially substituted celluloses, starch, cellodextrins, pectic substances, etc., and will impart water and alkali solubility to polysaccharides which, prior to carboxyethylation, do not possess these solubility characteristics.

Since the reaction takes place between a hydroxyl radical of the polysaccharide and the double bond of the acrylonitrile, it might be expected that the product obtained by carrying out the reaction in accordance with this invention would be a cyanoethyl ether of the cellulose or other polysaccharide. However, as may be seen from the foregoing examples, this is not the case for the nitrile groups are almost wholly hydrolyzed to the carboxyl group and the product obtained is the carboxyethyl ether of the polysaccharide in the form of its salts. The reaction, using cellulose as a typical polysaccharide, may be represented as follows:

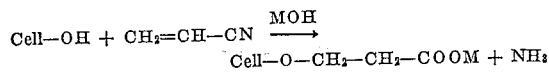

where Cell—OH represents an etherifiable hydroxyl group of cellulose and MOH is a strongly alkaline hydroxide. Thus it may be seen that the ethylenic addition and hydrolysis of the nitrile group appear to take place simultaneously. Whether these two reactions actually occur simultaneously or whether they take place as two separate but rapidly succeeding reactions is not known. In any event the product is the alkali salt of the carboxyethyl ether which may contain extremely small amounts of residual nitrogen indicating the presence of only a small amount of unhydrolyzed nitrile groups.

The reaction between the polysaccharide as, for example, cellulose and the acrylonitrile takes place in the presence of an alkaline reagent. Any strongly alkaline hydroxide as, for example, the alkali metal hydroxides such as sodium hydroxide, potassium hydroxide, etc. may be used. The alkaline reagent is believed to serve two purposes in this carboxyethylation reaction; to swell and disperse the cellulose or other polysaccharide, thus activating it, and to catalyze the acrylonitrile addition.

Any mode of introducing the alkaline reagent into the reaction mixture may be utilized. The cellulose or polysaccharide may be converted to an alkali cellulose or polysaccharide by suspending it in an organic solvent and then treating the suspension with an aqueous solution of from 20 to 50% concentration of the alkaline reagent. In this alkali cellulose preparation, the amount of alkaline reagent which is added is adjusted to approximately 3 to 6 moles per anhydroglucose unit, although the reaction proceeds favorably with higher proportions of alkali, or with lesser amounts provided that proportionately lesser amounts of acrylonitrile are used in the subsequent etherification reaction. To complete the alkali cellulose formation, the mixture of cellulose, or other polysaccharide, organic solvent, and alkaline reagent may then be agitated and heated for 0.5 to 1 hour at room temperature or any suitable temperature up to about 100° C., depending upon the boiling point of the solvent. An alternative method of alkali-polysaccharide formation consists of pretreating the polysaccharide with an aqueous alkaline reagent and then suspending the crumbs so formed in an organic solvent before the acrylonitrile reaction. Substantially the same results are obtained by either procedure.

By alkali cellulose or other polysaccharide as used in this specification and appended claims is meant the alkali metal salts of the polysaccharide.

As already pointed out above, the reaction between the alkali cellulose or other polysaccharide, and acrylonitrile is carried out in the presence of an organic solvent. Any inert organic solvent; i. e., any organic solvent having no tendency to react with the acrylonitrile, may be used as the medium for this carboxyethylation reaction. The main functions of the organic solvent are to serve as a heat transfer medium, and as a dispersing or insolubilizing agent so that the hydrophilic derivative will remain in a fibrous state. Suitable organic solvents which may be used for the reaction are dioxane, isopropanol, tertiary butanol, tetrahydrofuran, ethylene glycol diethyl ether, etc. Best results are obtained with organic solvents that dissolve water such as dioxane, tertiary butanol, etc. In these media water cannot accumulate in the cellulose derivative phase of the mixture. However, this carboxyethylation reaction may be carried out satisfactorily in such water-insoluble organic solvents as benzene, toluene, etc. The polysaccharide may be suspended in the solvent before the treatment with the alkaline reagent, or the alkali polysaccharide may be prepared and then suspended in the solvent. The amount of solvent used is determined by the type of agitation available for the heterogeneous reaction, since mixing becomes increasingly difficult with increasing cellulose proportions, and also depends upon the form of cellulose used; i. e., the state of subdivision. In general, with ground purified cotton linters, a cellulose to solvent ratio of about 1:9 to about 1:25 is used and with unground linters, a ratio of about 1:25 to about 1:50 is used.

The reaction in accordance with this invention is usually carried out at a temperature above about 50° C., preferably at a temperature from about 50° C. to about 140° C. and, more preferably, at a temperature of from about from 70° C. to about 95° C. If the particular solvent being used as the medium for the reaction possesses a boiling point below this temperature range, the reaction may be carried out under pressure. The temperature of the suspension of alkali cellulose in organic solvent is preferably adjusted to the reaction temperature prior to the addition of the acrylonitrile. Following this addition, the reaction is allowed to proceed at the specified temperature for from about 1 to about 4 hours and preferably from 1 to 2 hours. Longer reaction times may be used but it is believed that no advantages are realized and, in fact, above about 16 hours' reaction time, depolymerization of the cellulose and deetherification are noticeable.

The amount of acrylonitrile to be added to the polysaccharide material is dependent upon the degree of etherification desired in the final product. Usually about 0.5 to about 9 moles of acrylonitrile per anhydroglucose unit are added. Larger amounts may be used, if desired, but where the proportion is in the ratio of from about 9 to about 16 moles, the products obtained, due to interference from the polymerized acrylonitrile, are not very water soluble but are soluble in dilute alkali. In addition, the higher the ratio of acrylonitrile to cellulose, the larger is the amount of residual or unhydrolyzed cyano group in the final product. Where the ratio of acrylonitrile to cellulose is kept within the range specified above, the cyano content of the product is nil or of a very low order. Lesser amounts of the acrylonitrile may be used but the product generally does not have the desired degree of water and alkali solubility. The acrylonitrile may be added as such or as a solution in an inert organic diluent such as those used for carrying out the reaction.

The carboxyethyl ether of the polysaccharide, in the form of its alkali salt, may readily be isolated from the reaction mixture by filtration, centrifugation, etc., since it is in the same physical state as the original polysaccharide and is insoluble in the organic solvent medium. For example, when fibrous cellulose is converted to its carboxyethyl ether by the reaction in accordance with this invention, the product will likewise be fibrous. The carboxyethyl ether is thus not only in a very desirable form but being in this form is very easily purified by a simple washing procedure. In fact, if desired, the reaction mixture may be diluted, before separation, with the washing liquid. The solvent used for this washing operation should be one which will readily dissolve any unreacted acrylonitrile and the by-products of the reaction such as sodium acrylate formed by the hydrolysis of unreacted acrylonitrile, ammonia, and the alkaline reagent, but which solvent will not dissolve the carboxyethyl cellulose. A convenient solvent for this purpose is methanol. Since methanol itself will dissolve an alkali hydroxide but not an alkali acrylate, a methanol-water mixture, such as a 70 to 80% methanol, is preferable for the preliminary washing step. However, other solvents are equally operable. Anhydrous methanol may be used for the final wash in order to dehydrate the fibers. The carboxyethyl ether may then be dried in the form of its alkali salt, or, should the free acid form be desired, it may be acidified and isolated.

The carboxyethyl ethers of polysaccharides prepared in accordance with this invention have widespread applications. For example, carboxyethyl cellulose prepared as described herein may be used as a thickening agent in textile printing pastes, latex dispersions, etc., in oil well drilling muds, in special purpose adhesives and coatings, and in many other applications.

What I claim and desire to protect by Letters Patent is:

1. The process of preparing carboxyethyl cellulose by the reaction of alkali cellulose with acrylonitrile, said carboxyethyl cellulose being essentially free of cyanoethyl substituents, which process comprises reacting a suspension of alkali cellulose in an inert organic solvent with from about 0.5 to about 9 moles of acrylonitrile per anhydroglucose unit at a temperature of from about 50° C. to about 140° C. in the presence of an alkali metal hydroxide, the total alkali present in the reaction mixture amounting to from about 3 to about 6 moles per anhydroglucose unit.

2. The process of preparing carboxyethyl cellulose by the reaction of alkali cellulose with acrylonitrile, said carboxyethyl cellulose being water-soluble and essentially free of cyanoethyl substituents, which process comprises reacting a suspension of alkali cellulose in an inert organic solvent with from about 3 to about 9 moles of acrylonitrile per anhydroglucose unit at a temperature of from about 50° C. to about 140° C. in the presence of an alkali metal hydroxide, the total alkali present in the reaction mixture amounting to from about 3 to about 6 moles per anhydroglucose unit.

3. The process of preparing carboxyethyl cellulose by the reaction of alkali cellulose with acrylonitrile, said carboxyethyl cellulose being water-soluble and essentially free of cyanoethyl substituents, which process comprises reacting a suspension of alkali cellulose in an inert organic solvent with from about 3 to about 9 moles of acrylonitrile per anhydroglucose unit at a temperature of from about 70° C. to about 95° C. in the presence of an alkali metal hydroxide, the total alkali present in the reaction mixture amounting to from about 3 to about 6 moles per anhydroglucose unit.

CHARLES L. P. VAUGHAN.

REFERENCES CITED

The following references are of record in the file of this patent:

UNITED STATES PATENTS

| Number | Name | Date |
| --- | --- | --- |
| 2,181,264 | Dreyfus | Nov. 28, 1939 |
| 2,398,767 | Burke | Apr. 23, 1940 |
| 2,332,048 | Bock et al. | Oct. 19, 1943 |
| 2,332,049 | Bock | Oct. 19, 1943 |
| 2,349,797 | Bock et al. | May 30, 1944 |
| 2,362,900 | Groombridge et al. | Nov. 14, 1944 |
| 2,512,338 | Klug et al. | June 20, 1950 |
| 2,517,577 | Klug et al. | Aug. 8, 1950 |
| 2,539,417 | Grassie | Jan. 30, 1951 |

FOREIGN PATENTS

| Number | Country | Date |
| --- | --- | --- |
| 590,001 | Great Britain | July 4, 1947 |